United States Patent [19]

Johnson

[11] Patent Number: 5,792,369
[45] Date of Patent: Aug. 11, 1998

[54] APPARATUS AND PROCESSES FOR NON-CHEMICAL PLASMA ION DISINFECTION OF WATER

[76] Inventor: Dennis E. J. Johnson, 8530 Windfall Way, Blackforest, Colorado Springs, Colo. 80908

[21] Appl. No.: 627,278

[22] Filed: Apr. 4, 1996

[51] Int. Cl.$^6$ .................... C02F 1/48; C02F 1/50
[52] U.S. Cl. .................... 210/748; 4/316; 204/293; 205/755; 205/761; 210/192; 210/199; 210/205; 210/758; 422/186.12; 422/186.15
[58] Field of Search .................... 204/293; 205/742, 205/755, 761; 210/167, 192, 199, 205, 206, 748, 758; 422/261, 282, 186.12, 186.15; 4/316

[56] References Cited

U.S. PATENT DOCUMENTS

| | | | |
|---|---|---|---|
| 3,386,808 | 6/1968 | Handeland | 422/282 |
| 3,595,395 | 7/1971 | Lorenzen | 422/282 |
| 4,336,225 | 6/1982 | Hanford, Jr. et al. | 422/282 |
| 4,585,562 | 4/1986 | De Graw et al. | 210/97 |
| 4,752,401 | 6/1988 | Bodenstein | 210/764 |
| 4,936,979 | 6/1990 | Brown | 210/192 |
| 5,013,417 | 5/1991 | Judd, Jr. | 204/228 |
| 5,264,136 | 11/1993 | Howarth et al. | 210/760 |
| 5,303,729 | 4/1994 | De Marco | 422/282 |
| 5,603,840 | 2/1997 | Strittmatter et al. | 210/764 |
| 5,635,059 | 6/1997 | Johnson | 210/205 |

FOREIGN PATENT DOCUMENTS

4313388  11/1992  Japan .

Primary Examiner—Stanley S. Silverman
Assistant Examiner—Betsey J. Morrison
Attorney, Agent, or Firm—Michael de Angeli

[57] ABSTRACT

Apparatus and processes for non-chemical disinfection of a wide variety of biologically contaminated water streams include a canister with flow control means built therein such that a small portion of a water stream is exposed to disinfecting salts and returned to the principal stream to be treated. An ionized oxidizing gas plasma is also added, together with streams of metallic ions. Improved compositions of sacrificial electrodes for providing disinfectant metallic ions to a flow stream are also disclosed. The invention is described in connection with disinfecting recirculated water as used in cooling tower recirculated water air conditioning plants, commercial laundries, and aircraft head flush water, among other industrial water reclamation uses.

34 Claims, 4 Drawing Sheets

APPARATUS AND PROCESSES FOR NON-CHEMICAL PLASMA ION DISINFECTION OF WATER

FIELD OF THE INVENTION

This invention relates to improvements in disinfection of water, especially useful for treatment of recirculating water streams as encountered in, for example, cooling tower air conditioning systems, coin-operated laundry wash and rinse water, hospital and commercial laundries, swimming pools, potable water supplies, aircraft lavatory water supplies, and certain industrial and commercial water streams.

BACKGROUND OF THE INVENTION

Adequate disinfection, that is, destruction and removal of bacteria, viruses, and the like, is an increasingly important problem in a wide variety of water streams. On the one hand, it appears more and more inevitable that disinfection by chemical addition, e.g., by chlorination, or by addition of halogen complexes, for decades essentially the only commercial method of disinfection, will be prohibited in many marketplaces, as introducing toxins to the water. On the other hand, the cost of numerous commercial installations requiring water supplies are increasing rapidly as municipalities realize the cost to them of chemically purifying and treating water, and raise their fees accordingly.

For example, as of the filing date of this application, San Diego, Calif., requires an initial hookup fee of $6,000.00 per commercial washer. A typical coin-operated laundry includes fifty washers, thus involving an initial outlay of $300,000.00, strictly in license fees. Recycling the water would eliminate this very substantial cost of doing business. Similar situations are encountered in Orlando, Fla., and other municipalities, especially where already marginal water supplies are over-taxed by population growth and similar factors. End-users, investors, and regulatory authorities alike are seeking safe, reliable, and cost-effective methods and systems for recycling the large quantities of water consumed by these and many other commonplace uses, such as coin-operated laundries, restaurants, industrial rinsewater operations, commercial and hospital laundries, swimming pools and spas, and many more.

The principal difficulty in recycling water for such systems is in disinfection, so as to ensure an effective "kill" of all bacteria, protozoans, viruses, and the like, particularly given today's increased incidence of diseases spread by respiratory pathogens, such as AIDS, tuberculosis, and other infectious diseases spread by water-borne agents. Chlorination is often not effective in disinfecting such streams, particularly where the stream includes fats or other greasy and colloidal substances. Accordingly, a substantial need exists for processes and apparatus providing safe and reliable disinfection without chlorination of water streams from these and similar sources.

The need for improvements in disinfection of water is also becoming increasingly apparent in cooling tower heat exchange and air conditioning systems. In these systems, air-to-water heat exchangers are used to chill air which is then pumped into rooms to be cooled. The water is then sprayed into a cooling tower for evaporative cooling and reuse. Chilled-water air conditioning systems, where the water is cooled by heat exchange with chilled refrigerants, also require disinfection. More specifically, it has recently become apparent that numerous highly lethal bacteria, particularly the *legionella* bacteria, responsible for *"Legionnaire's Disease"*, and *tuberculosis =l bacteria, find an ideal breeding ground in cooling-tower and chilled water recycling systems. These bacteria are capable of passing through deteriorated and leaky soldered joints and the like, common in aging water systems, to reach the air in the ventilation system. Therefore, it is important that effective means be provided for disinfecting the water in such cooling tower and chilled-water air conditioning plants, to avoid the spread of such dangerous organisms and other respiratory pathogens.

The "head" water used to flush toilets and the like aboard airplanes also requires reliable and thorough disinfection. It is particularly important that this water be disinfected because the cabins of aircraft are subject to sudden changes in cabin pressure. When the cabin pressure is suddenly decreased, the vapor pressure of gases dissolved in the stored head water can exceed the vapor pressure in the air, such that quantities of gases are abruptly released into the recirculated air of the cabin. Given that the water collected in the aircraft heads is obviously contaminated with wide varieties of wastes, such sudden releases of dissolved gas can include high proportions of bacteria, viruses, and like infectious agents which are very dangerous to the respiratory health of passengers. Accordingly, it is apparent that a substantial need exists for disinfection of aircraft waste water. This is particularly important because aircraft head water is recycled, that is, used to flush the toilets repeatedly, due to weight limitations. Simply filtering the head water between uses is insufficient to remove various water-borne infectious species.

There are numerous additional areas wherein thorough and reliable disinfection of water streams would be highly desirable, particularly without chlorination or addition of other environmentally incompatible and dangerous chemicals, including potable water supplies, hospital and commercial laundries, swimming pools, spas, industrial washing operations, and the like.

The present invention is concerned principally with disinfection of such water streams in a particularly efficacious fashion. Various water streams encountered in practice will also require additional filtration, settling, flocculation, and like pre- and post-treatment steps. The particular components and process steps disclosed in this application for disinfection may be used in conjunction with components and processes disclosed in applicant's related patents and copending applications, and with known components, to provide non-chemical treatment apparatus and processes optimized to each particular process stream, and to provide "overkill" disinfection capacity.

For example, in U.S. Pat. No. 5,443,719, and in a continuation-in-part of that application, Ser. No. 08/481,994, filed Jun. 7, 1995, now U.S. Pat. No. 5,616,250, the applicant discloses a particularly desirable mixing vessel for mixing streams of ionized gases, coagulants, and like additives with a stream of water to be treated. The teachings of that patent and application can be used in conjunction with the present invention, where desirable. Similarly, in application Ser. No. 08/326,339, now U.S. Pat. No. 5,635,059 applicant teaches devices for exposing a stream of air to ultraviolet radiation for generation of a stream of ionized gas atoms and molecules. These may include singlet molecular oxygen, ionized oxygen atoms, ozone, ionized nitrogen, and other ionic gas species. Such a stream of ionized gas atoms, sometimes referred to herein as a plasma, is also employed in the present invention. The specific structure shown in Ser. No. 08/326,339 can be employed to generate such a stream of ionized gas atoms and molecules. Improvements thereon shown in continuation-in-part application Ser. No. 08/627,277 filed Apr. 4, 1996, now U.S. Pat. No. 5,685,994, can also be employed.

In copending U.S. application Ser. No. 08/377,620, now U.S. Pat. No. 5,597,479, applicant teaches several different types of filters which can be used for both pre- and post-treatment of water streams according to the present invention, and additionally shows how these and the mixing vessel of issued U.S. Pat. No. 5,443,719 referred to above may be usefully employed in treatment of a water stream. Again, the elements shown in Ser. No. 08/377,620 can be employed in connection with the new apparatus and processes disclosed herein in connection with particular water streams to be treated.

Finally, in copending application Ser. No. 08/377,621, now U.S. Pat. No. 5,622,622 applicant teaches an improved sterilizer for water and simultaneous generation of streams of ionized gas plasma, which again may be combined with the disinfection devices taught in the present application where appropriate. The above-mentioned copending applications are incorporated herein by reference.

OBJECTS OF THE INVENTION

It is an object of the present invention to provide an improved apparatus and methods for non-chemical disinfection of water, that is, for disinfecting water without addition of chlorine or other toxic species.

It is a further object of the invention to provide apparatus and methods for disinfection of water by providing streams of several disinfectant ion species, heretofore unavailable in readily employed, low energy cost disinfection systems.

SUMMARY OF THE INVENTION

The apparatus and method for disinfecting water streams according to the present invention involve addition of streams of one or more of particular metal ions provided by sacrificial electrodes, and/or particular disinfectant ions from salts, to the water stream, in combination with a stream of gas containing multiple ionized gas species. In an embodiment incorporating all of these disinfectant sources, a small portion, e.g., ten to twenty percent of the water stream to be treated, is separated therefrom. This portion of the water stream is permitted at least a minimum average residence time in a canister filled with granular salts of materials to be introduced into the water stream, e.g., silver, sodium, or calcium iodide or bromide salts, as are commercially available for other purposes. This small stream is reintroduced into the main water stream followed by injection of a stream of air including ozone, ionized oxygen and nitrogen atoms and molecules, and similar highly oxidative ionized gas species. This plasma stream may be generated in an ultraviolet exposure cell, essentially as disclosed in Ser. No. 08/326,339 or Ser. No. 08/627,277, filed Apr. 4, 1996, and now U.S. Pat. No. 5,685,994. The water stream having had the minor stream returned thereto and the ionized gas stream added thereto is then passed between two or more pairs of charged sacrificial electrodes of metallic materials, ions of which are to be added to the water stream.

In a particularly desirable embodiment, significant amounts of manganese are added to the water stream by employment of copper/manganese or manganese/silver sacrificial electrodes. Copper/silver electrodes may also be employed. Up to 10.0 weight % silica catalyst may be added to the metals of the electrodes. In either case, DC power, the polarity of which is reversed at intervals of on the order of seconds, is applied across the electrodes, causing a slow but continuous release of metal ions into the water stream, for disinfectant purposes.

Different combinations of these disinfecting techniques may be employed, and they may be combined with filtering, settling, flocculation, and similar conventional processes, practiced either as conventionally or as in the copending applications referred to above, depending on the specific water stream to be treated.

BRIEF DESCRIPTION OF THE DRAWINGS

The invention will be better understood if reference is made to the accompanying drawings, in which.

DESCRIPTION OF THE PREFERRED EMBODIMENTS

As mentioned above, the present invention relates principally to apparatus and techniques for disinfection of water which will find use in a wide variety of water streams to be treated. It is accordingly contemplated that the selection of the particular components shown, and their combination with filters, settling units, flocculating tanks, and like components, as shown in the prior art in addition to the copending applications mentioned above, is to be made on a case by case basis, that is, in response to analysis of the specific contaminants present in a particular water stream to be treated. Therefore, while examples are given herein of the use of the new components and techniques of the invention, the invention is not to be limited thereby, but only by the following claims.

Figure 1:
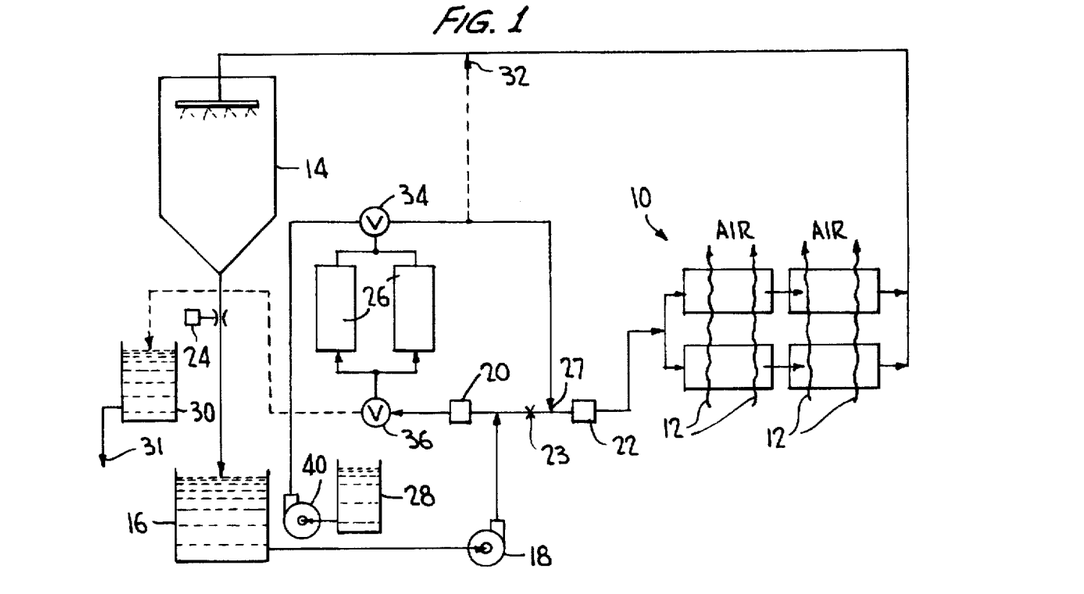
FIG. 1 shows an overall view of a cooling tower air conditioning system providing disinfection of recirculating cooling water according to the invention.

FIG. 1 shows in schematic form a typical cooling tower system for cooling water for air conditioning purposes, incorporating disinfection according to the invention. The particular arrangement shown is typical of cooling tower systems of up to 100 ton capability; of course, such units could be operated in parallel or with further modifications for larger systems.

The fundamental principle of such cooling tower systems is that water, having been warmed by heat exchange relationship with a stream of air, flows downwardly through the cooling tower, so as to be cooled by exposure to the ambient air. The cooled water is then again placed in heat exchange relationship with the stream of air, cooling the air, and the process repeated. The chilled air is then ducted to the rooms to be cooled.

For example, as shown in FIG. 1, cool water is introduced to a plurality of heat exchange units 10 through which air to be chilled flows as indicated at 12. The air is then ducted to rooms to be cooled. After leaving the heat exchanger 10, the water is piped to a cooling tower 14 where it is permitted to give up heat to the atmospheric air. The cooled water then flows to a sump 16 where it is pumped by a pump 18 back to the heat exchangers 10 in a repetitive cycle. In related chilled-water systems, the cooling tower is replaced or supplemented by a heat exchange step involving an easily chilled refrigerant (previously Freon, now being replaced with non-CFC based refrigerants) to further chill the water. That alternative will be understood by those of skill in the art.

As indicated above, such cooling-tower and chilled-water air conditioning systems provide fertile breeding grounds for bacteria viruses and other pathogens which can leach into the air system, especially through leaky soldered joints and the like in the heat exchangers. Where these bacteria are dangerous, such as legionella or tuberculosis, the effect can be fatal. Viruses causing various respiratory ailments can be spread similarly. It would be prohibitively costly to rebuild all preexisting cooling tower or chilled-water air conditioning systems to avoid all points of entry of bacteria or viruses into the air system, even if it were possible. Cooling tower systems, being open to the atmosphere, are particularly susceptible to water contamination by entry of airborne bacteria and the like.

It is not feasible to disinfect the cooled air, e.g., by ultraviolet irradiation or the like. More specifically, to expose the air stream to UV for a time sufficient to kill all pathogens would introduce significant flow restrictions in the air stream. Very extensive UV sources would be required, adding to both the initial and operating costs of such a system. Finally, UV irradiation would heat the air, defeating the purpose of the installation.

Accordingly, it is important to provide thorough and reliable disinfection of the cooling tower and chilled-water systems in air conditioning plants.

According to the invention, therefore, disinfector units are added at 20, 22, and 24. In the embodiment shown, on the order of fifteen percent of the total water stream is diverted by valve 23 from the main recycle flow described and passed through a first disinfector unit 20. The diverted portion of the stream is then filtered by one or more filter units shown generally at 26. These may comprise filters as shown in copending application Ser. No. 08/377,620, or other functionally-similar units. The disinfected portion is then returned to the main stream at 27. The entire stream may also pass through a second disinfector unit at 22. A gas plasma stream from source 24 is added to the water returning to the sump 16. In another embodiment, exemplified by the detailed drawing of FIG. 2, the plasma stream from source 24 can be introduced into the water stream at essentially the same point the biological disinfector 20 is installed, to ensure complete oxidation of bacteria in the water stream, thereby sterilizing the cooling water, to help prevent the spread of any bacteria. A line 32 vents any undissolved gas to the cooling tower 14.

Backwash of the filters 26 is provided by way of water stored at 28. The backwashed water may be stored in a holding tank 30 before being drained to the sewer at 31. Three-way valves 34 and 36 are provided to allow appropriate connection, as is a backwash pump 40.

It will be appreciated that in the embodiment shown in FIG. 1, a portion of the recirculating water stream is disinfected and filtered before being mixed back into the main stream at 27. Over a short time, all the recirculating water in the system will pass through the biological disinfector units. More particularly, all of the water passes through the biological disinfector unit 22 while the stream of plasma ions (that is, a gas comprising various ionized gas atoms) is added to the returning stream at 24. As mentioned above, in differing arrangements, all the water can pass through the biological disinfectors 20, 22 and filters 26; this is accomplished by completely closing valve 23.

Figure 1A:
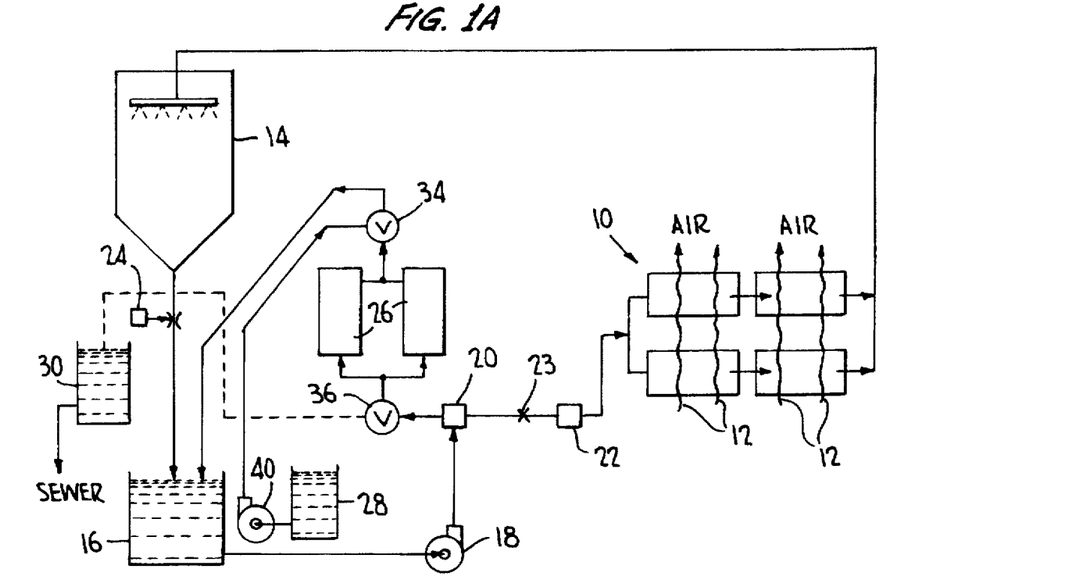
FIG. 1A shows an alternate arrangement for a similar system.

FIG. 1A shows an alternative arrangement for incorporating disinfection of water according to the invention in a cooling tower air conditioning system. In this embodiment, a portion of the overall cooling water flow motivated by pump 18 is diverted from heat exchangers 10 and directed to disinfection unit 20 and filters 26, to be returned to sump 16. This embodiment may be more readily retrofit to preexisting systems than that of FIG. 1.

Figure 2:
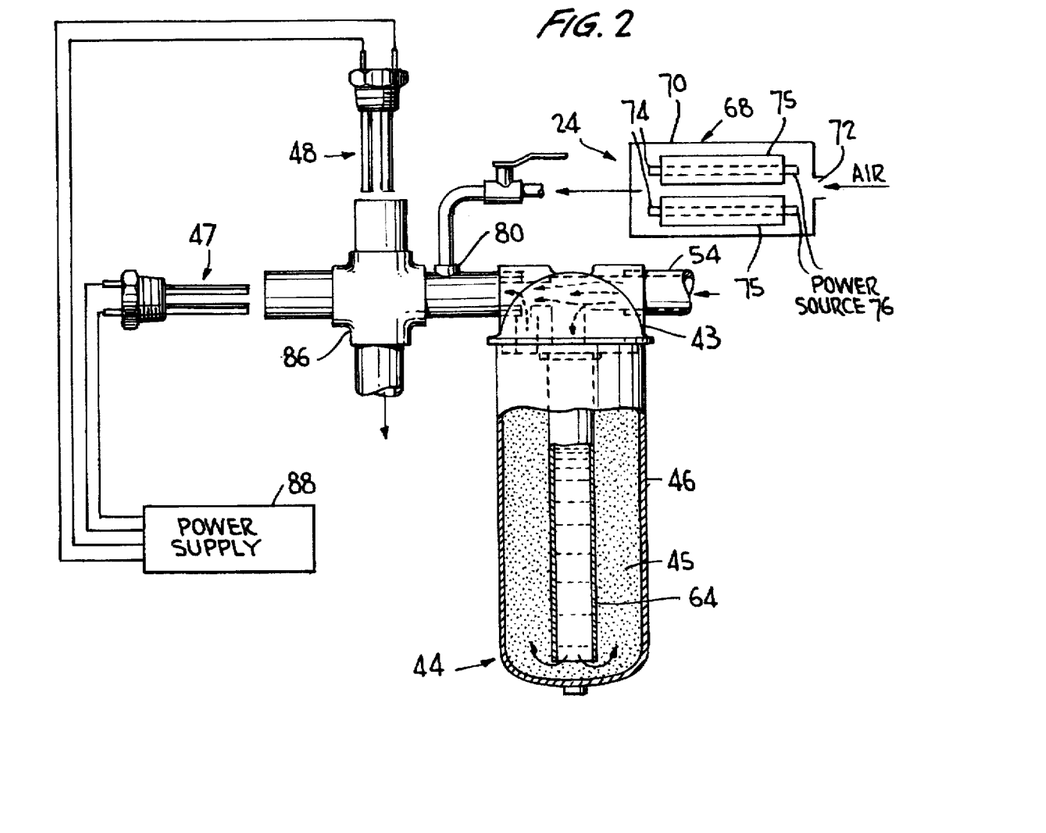
FIG. 2 shows one possible arrangement of components for exposure of a portion of the water stream to be treated to salts, and for addition of streams of ionized gas plasma and metal ions to the water stream.

FIG. 2 shows an integrated arrangement for complete disinfection of a water stream, that is, for oxidation and destruction of all manner of bacteria, viruses, protozoans, and the like, according to the invention. An ionized gas plasma is supplied by unit 24. A portion of the water stream is exposed at 44 to disinfecting salts, such as silver, sodium, or calcium iodide or bromide salts. Metal ions are added to the water stream as indicated at 47, 48.

Turning first to the means 44 for introducing the disinfecting salts into the water, here the consideration is that a relatively small fraction of the water stream should be exposed for a relatively lengthy period of time to the salts, such that an effective quantity of the disinfecting salts become dissolved in the separated fraction of the water stream, which is then bled back into and mixed with the original stream. It would not be satisfactory to expose the entire water stream to the salt, as then the salts would be added to the water stream at an unnecessarily high rate, and would require too frequent replenishment.

The salt chosen may be granular silver, sodium, or calcium bromide or iodide salt, or mixtures thereof. Where, for example, a silver bromide salt is dissolved in water, followed by introduction of suitable ionized gas plasma atoms according to the invention, hypobromous acid is formed. This acid is highly oxidative (as discussed below in connection with Table I) and hence is an effective bactericidal and viricidal disinfectant. Where, for example, a calcium iodide salt is provided, similarly oxidative iodoic acid is formed.

The salt materials specified are commercially available. As noted, the effect of exposure of the water to these materials, followed by mixing with the ionized gas stream, is to form effective disinfectant amount of hypobromous acid and/or iodoic acid in situ, that is, in the water stream itself. Formation of the acid in situ is highly beneficial in that the entire oxidation potential of the acid is immediately available to disinfect the bacteria and viruses by oxidation, and in that physical handling of corrosive and dangerous chemicals is entirely avoided.

Figure 3:
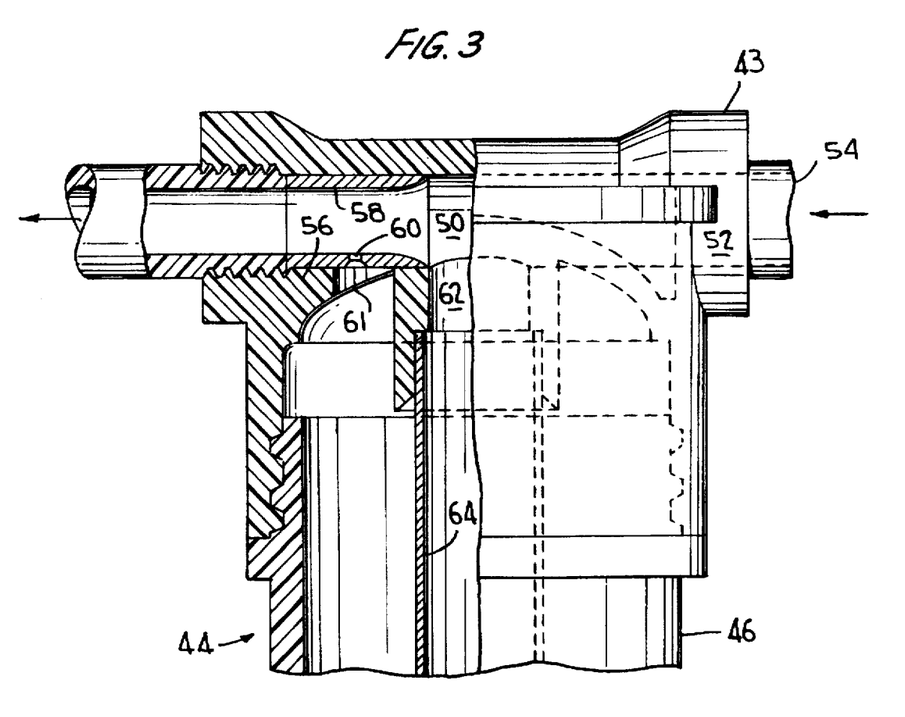
FIG. 3 shows a detail of one embodiment of a particularly convenient assembly for exposure of the water stream to salts.

According to a particularly convenient implementation of this aspect of the invention, the desired salts 45 are disposed in a sealed canister 46. The canister 46 is fitted with a cap 43. The canister 46 and cap 43 are commercially available parts, greatly reducing the cost of the system according to the invention. Details of the cap are shown in FIG. 3. As shown therein, cap 43 has a transverse passage 50 formed therein having an inlet end 52 receiving the incoming stream via an inlet conduit 54. As supplied, the cap 43 has an exit orifice 56 of the same cross-sectional area as the inlet orifice 52. According to the invention, a section of tubing 58 is inserted into the second exit orifice 56 of the cap, reducing the cross-sectional area of the exit side of the transverse passage 50 by on the order of twenty percent. This increases the speed of water flowing therethrough, normally at gauge pressure of 20–60 psi, and flowing at thirty to fifty gallons per minute. The increased flow velocity through the exit orifice 56 of the cap provides a vacuum at a metering orifice 60, drilled in the tubing 58 and aligned to face downwardly, open to the interior of the canister through a larger hole 61 drilled through the lower wall defining the exit orifice 56 of the transverse passage 50 in cap 43. As shown, transverse passage 50 also communicates with a downwardly extending passage 62 receiving a downwardly extending dip tube 64, extending to the lower closed end of canister 46.

In use, a water stream to be treated is supplied at conduit 54. Water fills the canister 46 through dip tube 64. A relatively small quantity of the water stream (one to twenty percent of the total water stream, the remainder passing directly through the transverse passage 50) is drawn upwardly through the metering orifice 60 by the vacuum created in the exit orifice 56 due to the increased flow rate therethrough, as shown by the arrows in FIG. 2. This relatively small proportion of the stream is exposed to the salts while resident in the canister 46, for a period of time determined by the relative cross-sectional areas of the metering orifice 60, the inlet passage 52, and the reduced area exit passage provide by tubing 58. The proper dimensions can be set by experiment and are not critical within certain wide ranges. For example, where the inlet passage 54 is on the order of three-quarter inches ID, and an area reduction of 10%–50% is provided by insertion of tubing 58, the metering orifice can be on the order of 0.125–0.183 inches diameter i.e., on the order of 1%–20% of the area of the outlet side of the transverse passage, such that on the order of one to ten percent of the main water stream is diverted to flow through the granular salt material 45 in the canister 46. The average residence time of this small portion of the total flow in the canister is on the order of one to fifteen minutes; in this time, effective quantities of the salts are dissolved in the water stream flow, forming disinfectant acids when mixed with the ionized gas stream.

In the embodiment shown in FIG. 2 (which, again, is not limiting on the invention, but is merely exemplary thereof), after the water stream has been divided such that a small amount of it flows into the salt-containing canister 46 and is recombined with the main stream, a stream of ionized gas plasma from source 24 is next introduced. Typical constituents of the ionized gas plasma are detailed in connection with Table I below. Briefly, a stream of air including an effective quantity of ionized gas atoms, such as atomic oxygen, ionized oxygen radicals, ozone, and ionized nitrogen, is provided, conveniently from a plasma generator 68 as shown in application Ser. No. 08/326,339 and the continuation-in-part thereof, Ser. No. 08/627,277, filed Apr. 4, 1996.

As set forth in those applications, a suitable plasma generator 68, that is, an effective source of a stream of ionized gas atoms in air, comprises a sealed box 70 having an air inlet 72. A stream of air is drawn into the box 70 either by a pump or by connection of the air stream after ionization to the water stream under circumstances such that a venturi effect created by the flow of the water provides suction to the air stream. In either case, the incoming air stream is ducted, e.g., by tubing 75, around ultraviolet lamps 74 which are energized by a suitable power supply 76 so as to ionize an effective fraction of the atoms of the air. This process is well known per se; the copending applications referred to disclose particularly beneficial apparatus for ionizing a substantial fraction of the atoms of the gas in an efficient and reliable way. Applicant finds in particular that conventional UV lamps also emit additional ionizing infrared radiation in response to application of high-frequency electrical power (e.g., of 50–115 volts, 500–1500 milliamperes, and 20,000–50,000 Hz), especially when pulsating the power at such frequencies between about 50% and 100% of its peak value. As set forth in the copending applications referred to above, the ionized gas atoms may also be exposed to a magnetic field during their exposure to ionizing radiation. A plasma stream including significant percentages of ozone and ionized nitrogen and ionized oxygen atoms, including ionized singlet oxygen atoms and molecular species, is thus formed at reasonable energy costs.

The stream of ionized gas plasma is introduced to the water stream at 80 as shown. A further venturi restriction may be provided, to draw the stream of gas into the water stream. Following this, streams of metal ions are added to the water stream from one or more pairs of sacrificial electrodes 47, 48 which are directly exposed to the water stream by being installed in a cross fitting 86 or the equivalent. The electrodes are charged by connection to a DC power supply 88 providing DC on the order of 6–24 V, 500–5,000 ma across both pairs of electrodes. The polarity of the DC is reversed at intervals on the order of seconds (e.g., between about 1 second and 5 minute intervals), to ensure even sacrifice of the materials of the electrodes, and to preclude buildup of conductive contaminants on the electrodes.

The materials of the electrodes 47, 48 vary with the metal ions desired to be added to the water stream. These in turn are selected in accordance with the specific contaminant chemistry of the water stream of interest. It is well known, of course, that copper and silver ions are effective in disinfection by killing organisms in a water stream. Manganese is also less commonly used for this purpose. According to the invention, silica is added to the materials of the electrodes when these are melted for casting. The electrodes accordingly may comprise copper and silver in relative proportions of between 50–95 weight % copper, up to 1.0 weight % silica, balance silver; 70–95 weight % copper, up to 1.0 weight % silica, balance manganese; or 80–90 weight % manganese, up to 10 weight % silica, and at least 5 weight % silver or copper. These compositions, as discussed herein and in the claims which follow, refer to the materials of the electrodes as weighed prior to melting for casting as electrodes.

The addition of up to 10 weight % silica, in particular to the manganese compositions provided according to the invention, is found to be desirable to enable casting of homogenous alloy electrodes of these metals using commonly available foundry equipment. More specifically, the addition of a small amount of silica (as powdered silica sand added to the foundry pot) to a copper/manganese mixture renders this alloy combination castable, which is not normally feasible. Silica may also be added to manganese/silver and copper/silver electrode compositions according to the invention, for facilitating casting. Addition of silica in rough proportion to the amount of manganese provided assists in the homogenous mixing of the molten metals. Therefore, according to an important aspect of the invention, silica is added to the metals of electrodes cast for the purpose of water disinfection. Silica addition may also be beneficial in the disinfection process. Cast electrodes having silica added also appear to be more uniformly sacrificed in use, adding to their effective lifetime.

Electrodes comprising manganese and silver, with silica added as noted, are used when desired to form specific disinfectant compounds, or when needed to avoid use of copper, commonly used in such sacrificial electrodes for water treatment purposes. Excessive use of copper can lead to plating of the interiors of the communicating pipes and other fittings.

Preferably, the water stream to be treated is mixed with the (1) small portion thereof having been exposed to the salts, (2) the gas plasma stream, and/or (3) streams of metal ions from electrodes 47, 48 in highly turbulent fashion. In particular, turbulent mixing ensures efficient reaction of the constituents of the streams, such as formation of permanganate radicals ($MnO_4^-$) by combination of manganese ions released by the electrodes and ionized oxygen in the plasma stream. Other disinfectant species thus formed in situ are discussed below. The arrangement of FIG. 2 provides turbulent mixing within cross fitting 86, resulting in efficient disinfection of the water stream.

It is generally understood in the art that the mechanism of disinfection is oxidation, that is, that bacteria, viruses, algae, protozoans, and other potentially dangerous biological pathogens in water can be destroyed by exposure to oxidative species. The oxidized remains can then be removed by filtration, settling, flocculation, and other known techniques, any or all of which can be combined with the disinfection techniques of the present invention. Chlorine, as commonly used in water treatment, is also an oxidant; that is, the chlorination process, which has been used for decades for disinfection of water, similarly disinfects by killing organics by oxidation, as employed according to the present invention. However, as shown by Table I below, chlorine, and the hypochlorite ion formed when chlorine is dissolved in water (as well as related chlorinated disinfectant treatment compounds) are in fact significantly less effective oxidizers than are the additional oxidants added to the water stream according to the present invention. Chlorine also is not capable of oxidizing and disinfecting biological pathogens when encapsulated by emulsified oils, grease, colloidal particles, and the like, as commonly encountered in contaminated water. Accordingly, not only are the corrosive and possibly dangerous side effects of chlorine avoided through use of the present invention, but the disinfection function is performed more efficiently due to the increased oxidation potential of the disinfecting substances added according to the invention.

Table I compares the oxidation potential of the various species of plasma ions provided by the plasma ion generator, and other oxidative species formed in the water stream according to the invention, to those of chlorine and the hypochlorite ion. The plasma stream includes ionized atomic and molecular oxygen, that is, includes ionized singlet molecular oxygen and multiple-atom ionized oxygen molecular species, oxygen radicals, and ozone. Nitrogen ions are also formed in the plasma generator 68. When the plasma stream is mixed with the water stream at 80, additional hydrogen peroxide, hydroxyl radicals, and perhydrogen radicals are formed. The metal ions from electrodes 47, 48 react with the oxygen atoms to form permanganate ions, and with the oxygen and nitrogen ions to form copper and silver nitrates. Bromide and iodine react with the plasma gas ions and the perhydrogen and hydroxyl radicals to form hypobromous and iodoic acids.

As shown in Table I, the oxidation potentials of ions added to the water stream according to the invention range from an oxidation potential of 1.7 electron volts (eV) for the perhydrogen radical (H+) up to 2.8 electron volts for the hydroxyl radical ($OH^-$). By comparison, chlorine has an oxidation potential of 1.36 electron volts.

Also shown in Table I are the oxidation potentials of the permanganate ion, that is, $MnO_4^-$, formed by release of manganese and oxygen ions in the water, and hypobromous acid $H(OBr^-)$, formed by bromide salt added to the water stream in the canister 46 followed by combination with ionized oxygen added as part of the plasma gas stream. Each of these have oxidation potentials that are substantially higher than chlorine as commonly used.

Table I also includes a column headed "Relative Oxidative Capability" wherein the oxidation potential of chlorine is equated to 1, and the oxidation potentials of the materials added to the water according to the invention are calculated in ratiometric form, for ready comparison.

It will be appreciated that while chlorine is listed on the Table, as is the hypochlorite ion commonly formed by chlorine in water, these toxic substances conventionally used for water treatment are not employed according to the invention, but are avoided; these are shown in Table I merely for comparison purposes.

Finally, note that silver nitrate ($AgNO_3$) and copper nitrate ($CuNO_3$) are formed by combination of silver and copper ions released by the sacrificial electrodes, combined with ionized oxygen and nitrogen in the water; these provide additional bactericidal and algicidal functions and provide an "overkill" capability to the oxidants listed in Table I per se. Formation of ionized nitrogen is particularly promoted by simultaneous exposure of the air stream to high-energy ultraviolet radiation and stronger magnetic fields, as in the preferred embodiment of the plasma source shown in copending Ser. Nos. 08/326,339 and 08/627,277, now U.S. Pat. No. 5,685,994.

TABLE I

| OXIDATIVE SPECIES ADDED | OXIDATION POTENTIAL (eV) | RELATIVE OXIDATIVE CAPABILITY |
| --- | --- | --- |
| Hydroxyl Radical ($OH^-$) | 2.80 | 2.05 |
| Atomic (half) Oxygen and Singlet Molecular Oxygen ($O^-$), Oxygen Radicals ($O_2^\pm$) | 2.42 | 1.78 |
| Ozone ($O_3$) | 2.07 | 1.52 |
| Hydrogen Peroxide ($H_2O_2$) | 1.77 | 1.30 |
| Perhydrogen Radical ($H^+$) | 1.70 | 1.25 |
| Permanganate ($MnO_4^-$) | 1.67 | 1.23 |
| Hypobromous Acid ($H(OBr^-)$) | 1.59 | 1.17 |
| COMPARISONS | | |
| Hypochlorite (HCl) | 1.49 | 1.10 |
| Chlorine ($Cl^-$) | 1.36 | 1.00 |

Thus it can be seen by examination of Table I that the disinfecting oxidative species added according to the invention are each substantially more effective than chlorine as normally added. The variety of oxidative species added according to the invention combine to provide a very substantial bactericidal, viricidal, and protozoan disinfecting capability which has been shown to be highly effective in destruction of these dangerous organisms in a water system.

As discussed above, the disinfection apparatus and processes taught according to the invention can be integrated into a large number of differing water streams, with various components added or subtracted, depending on the precise chemical and biological characteristics of the stream to be treated, and the purification requirements on the ultimate effluent resulting.

For example, FIG. 2 teaches three principal components of a disinfection method, that is, (1) exposure of a minor portion of the water stream to bromide or iodide salts and mixing this back with the water stream, (2) introduction of an ionized gas plasma, and (3) introduction of metal ions. All three may be employed where the water stream is from a contaminated source that is likely to contain dangerous bacteria, viruses, or protozoan biological agents.

For highest efficiency, all of the oxidant and disinfectant species should be introduced into the water stream at essentially the same point, and in a highly turbulent zone, to ensure thorough mixing and complete reaction. Furthermore, note that the metallic ions and salt-derived ions are released in situ at or closely spaced from the introduction of the plasma ions, such that the reactions therebetween occur simultaneously and efficiently. The arrangement shown in FIGS. 2–3 is very advantageous for these reasons. In addition to destroying bacteria, viruses and the like by oxidation, it is believed that exposure of such contaminants to the ionized gas plasma assists in coagulation thereof into larger particles with other water borne solids and other debris, so as to be more readily physically filtered therefrom. However, the invention is not to be limited by this theory of operation.

Turning now to further examples of the use of the invention, as noted, it is important that head water in aircraft, that is, water used for flushing toilets and the like, be disinfected. More specifically, the cabins of aircraft are subject to sudden changes in cabin pressure. When the cabin pressure is suddenly decreased, the vapor pressure of gas dissolved in the stored head water can exceed the vapor pressure in the air, such that quantities of dissolved gas and atomized moisture are abruptly released into the atmosphere of the cabin. Given that the head water collected in the aircraft lavatory is obviously contaminated with wide varieties of human wastes, such sudden releases of dissolved gas can include high proportions of bacteria, viruses, and like biological agents which are very dangerous to passengers. Accordingly, it is apparent that a substantial need exists for disinfection of aircraft lavatory waste water. This is particularly important because aircraft head water is often recycled, that is, the same water is used to flush the toilets repeatedly due to weight limitations.

Figure 4:
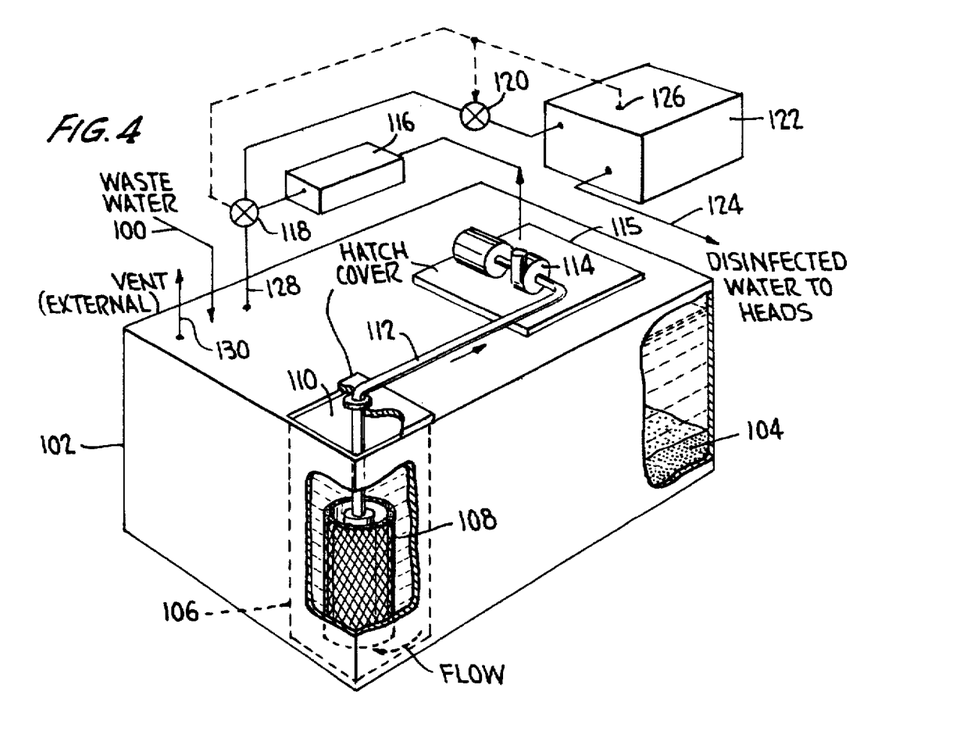
FIG. 4 shows a schematic view of a system for disinfection of recycled aircraft head flush water according to the invention.

FIG. 4 shows a compact and efficient system for disinfecting recycled aircraft head water as used for flushing toilets and the like. A supply tank 122 is provided with an initial charge of disinfected water, and supplied to the heads as indicated at 124. Incoming waste water at 100 is stored in a collection tank 102. Solids are permitted to settle out as indicated at 104 for subsequent removal after the aircraft has landed. An inner compartment 106 is formed within tank 102, having an opening at its lower extremity, allowing water to flow upwardly into the compartment 106. Disposed within compartment 106 is a magnetic separation filter 108 which may, for example, be one of the multiple-element, electrically charged filters shown in application Ser. No. 08/377,620. Filter 108 can be removed by way of a hatch 110 for compaction, crushing, or incineration, for example, when settled solids 104 are removed.

Water to be disinfected is withdrawn from the center of filter 108 by pump 114 via line 112. Pump 114 is connected to a disinfecting unit 116 which is generally as shown in FIG. 2, although it will be understood that the various optional disinfection methods discussed herein are all potentially useful in this application. Pump 114 is mounted on a second hatch 115 to enable ready access to the interior of tank 102. Disinfected water from unit 116 traverses a three-way valve 118 and a solenoid valve 10 to be stored in a disinfected water supply tank 122. Water is withdrawn from tank 122 for subsequent washing, flushing of toilets, and the like as indicated at 124. A float or level switch 126 in tank 122 controls the position of valves 118 and 120 such that excess disinfected water is returned to tank 102 via line 128. A vent 130 is provided connected to an aircraft external vent for exhausting of gases formed during biological digestion occurring naturally within tank 102. Other connections for on-ground draining and flushing the tank and the like may be provided, but are not shown in the interest of simplicity.

By provision of a disinfecting system 116 according to the invention in conjunction with a tank for collecting waste water and a second tank for storing disinfected water until needed, the heads will only be flushed with disinfected water, essentially eliminating the problem of spreading bacteria, viruses, and other potentially infectious biological agents throughout aircraft passenger compartments.

Figure 5:
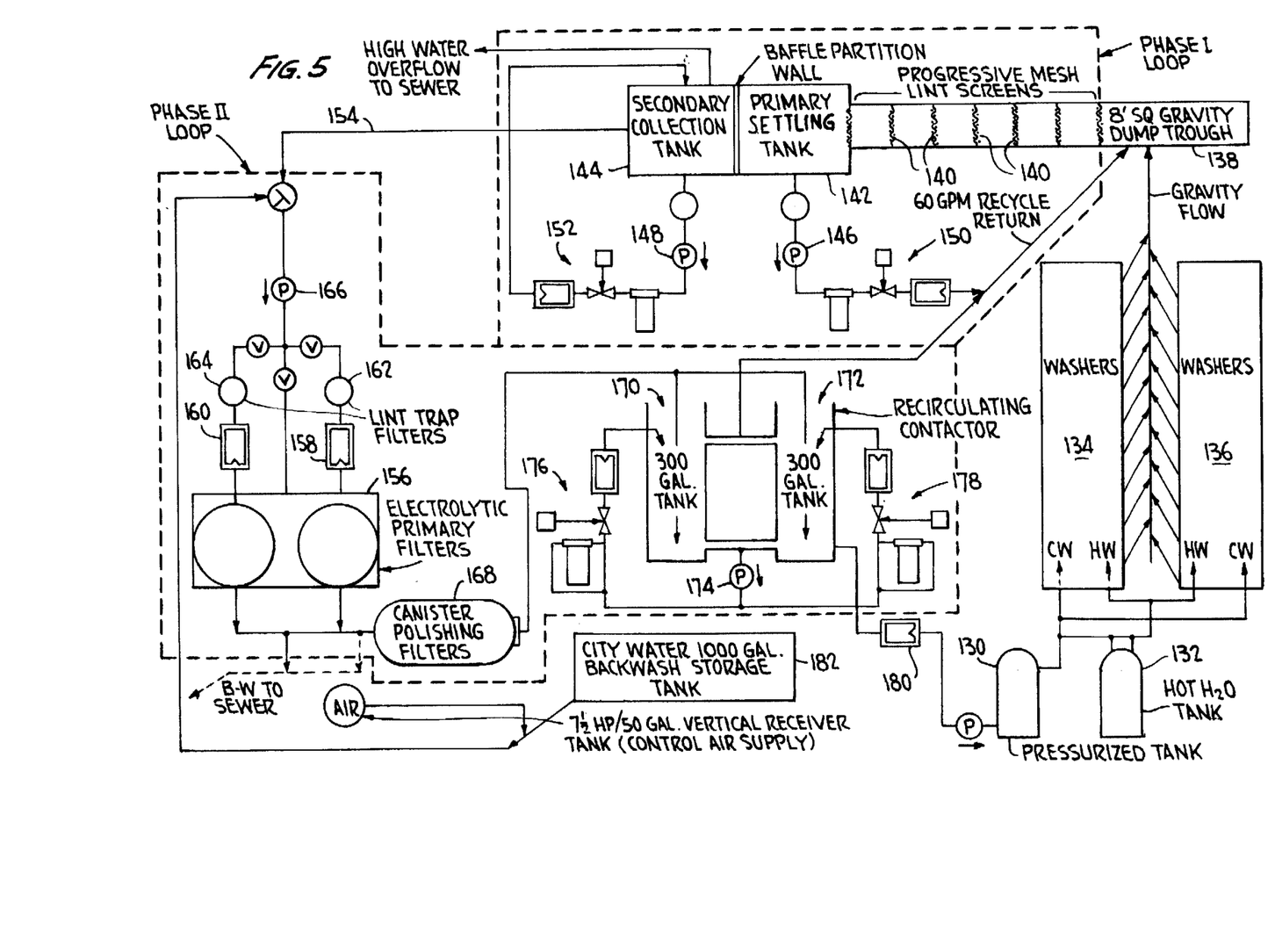
FIG. 5 shows a schematic view of a commercial coin-operated laundry water system, incorporating disinfection provided according to the invention.

FIG. 5 shows a further example of the use of the disinfection methods and apparatus provided according to the invention, in this case, in a system for recycling water from a coin-operated laundry. Similar systems could be employed for other comparable uses, of course. Hot and cold water are provided from pressurized tanks 130, 132, respectively, to washers ganged as indicated at 134, 136. Effluent water from the washers, including both wash water and rinse water, enters a gravity dump trough 138 and flows downwardly under the influence of gravity through a number of lint screens which are ordered by increasingly fine mesh sizes. A preliminary filtering step is thus provided.

In a phase I disinfection loop, water flowing through lint screens 140 is provided to first and second settling tanks 142, 144. Water is continually withdrawn from tanks 142, 144 by pumps 146, 148 and is disinfected according to the invention as shown schematically by components 150, 152, these generally corresponding to the inventive components shown in FIGS. 2 and 3, and returned to tanks 142, 144. A significant preliminary disinfection function is thus provided.

A portion of the water being recirculated in the phase I loop is withdrawn by way of line 154 and supplied to a phase II loop, including electrolytic primary filters 156, downstream of further purification units 158, 160. Water may be pumped through the phase II loop by a pump 166. Water leaving electrolytic primary filters 156 is polished at 168. The polishing filter 168 and primary filters 156 may be as disclosed in applicant's copending applications referred to above, specifically, Ser. No. 08/377,620. As indicated schematically, units 158, 160 may comprise further pairs of metallic electrodes as above, connected to suitable power supplies for releasing metallic ions into the water before admission to the primary filters 156. In particular, typically water flow through the system will be essentially continuous throughout each day's operations, but will be shut down at night. The additional metallic ions added at 158, 160 are sufficient to preclude any overnight growth of bacteria or the like in the filter 156 and downstream components,. including filter 168 and holding tanks 170, 172. Further lint trap filters may be provided at 162, 164, as shown. City water is supplied at 182 and appropriate valving is provided to allow use of pump 166 to periodically backwash filters 156, 168, 162, 164.

After polishing in filter 168, the water is stored in tanks, two tanks being shown schematically at 170, 172; of course, this is not a limitation on the invention. Water in these tanks is continually recirculated by a pump 174 through further disinfection units 176, 178; as indicated schematically, these again include the components provided according to the invention, as shown in FIGS. 2 and 3. Further "overkill"

disinfectant species, particularly residual metal ions, may be added as indicated schematically at 180, before the water supplied from tanks 170, 172 is stored in the pressurized cold and hot water tanks 130, 132.

The FIG. 5 system is representative of a generic water treatment system for recycle water disinfection and reuse in many commercial and industrial installations where water conservation is required. Thus, it should be appreciated that the system shown in FIG. 5, and the other systems detailed herein, is exemplary only and simply provides an example of use of the disinfecting methods and apparatus according to the invention in generally known water uses. Various modifications and multiplication of individual components, additional filters, flocculent tanks, settling tanks, and the like may also be added as deemed necessary.

As further examples of use of the invention, hospital laundries must thoroughly disinfect linens, garments, and the like on which various bodily fluids have been spilled, and therefore all three of the disinfecting expedients discussed in detail in connection with FIGS. 2 and 3 above would desirably be employed in water recirculating systems for this use. In certain industrial water recycle operations, such as commercial and/or industrial rinse water operations and the like, it may be sufficient to expose the water stream to the salts and add the ionized gas plasma, that is, to eliminate the metal ion addition step, since these water streams are not intended for human contact after recycling. Where the water stream is recirculated through a heat exchange plant for air conditioning, as above, or from swimming pools or spas, it may be sufficient to add the ionized gas stream and the metallic ions, avoiding the salt exposure step. However, again, these are given only as examples, and do not form limitations on the invention. Similarly, additional system components that may be desired, such as magnetic separation and filtration, flocculation, and settling apparatus as shown in the copending applications referred to above, can in many cases be desirably combined with the specific apparatus shown, described, and claimed herein.

Therefore, while several preferred embodiments of the invention have been described in detail, the invention is not to be limited thereby, but only by the following claims.

What is claimed is:

1. A process for disinfecting a water stream, comprising the steps of:
    exposing a small fraction of said water stream to one or more salts from the group consisting of silver, sodium or calcium bromide or iodide salts, and returning said small fraction to said water stream;
    generating and mixing with said water stream a stream of air including an effective proportion of oxidizing gas atoms and molecules, including one or more of ionized molecular or atomic oxygen or nitrogen, or ozone, and
    generating and mixing with said water stream a stream of metallic ions, including one or more of copper, manganese, and silver.

2. The process of claim 1, wherein said streams of water, including said returned small fraction thereof, air including oxidizing gas atoms and molecules, and metallic ions, are mixed with one another substantially simultaneously under highly turbulent flow conditions.

3. The process of claim 1, wherein said stream of air including an effective proportion of oxidizing gas atoms and molecules is formed by exposing a stream of atmospheric air to ultraviolet radiation.

4. The process of claim 3, wherein said ultraviolet radiation is provided by one or more low-pressure mercury vapor lamps driven by high-frequency alternating current supplied to said lamps at between 50–115 volts, 500–1500 milliamperes, and 20,000–50,000 Hz.

5. The process of claim 4, wherein said high-frequency alternating current is repetitively pulsed between about 50% and 100% of its peak value.

6. The process of claim 1, wherein said step of generating and mixing with said water stream a stream of metallic ions, including one or more of copper, manganese, and silver, is performed by application of direct current to sacrificial electrodes disposed in said water stream, said electrodes being comprised of the metals ions of which metals are to be added to said water stream.

7. The process of claim 6, wherein a first pair of said electrodes are cast of between 70–95 weight % copper, up to 1 weight % silica, balance manganese.

8. The process of claim 6, wherein a first pair of said electrodes are cast of between 80–90 weight % manganese, up to 10 weight % silica, and at least 5–10 weight % silver or 5–10 weight % copper.

9. The process of claim 6, wherein a first pair of said electrodes are cast of 50–95 weight % copper, up to 1 weight % silica, balance silver.

10. The process of claim 6, wherein direct current of between 6–24 volts and 500–5000 milliamperes is supplied to said electrodes, and the polarity of said direct current is reversed at intervals of between 1 second–5 minutes.

11. The process of claim 1, wherein said step of exposing a small fraction of said water stream to one or more of silver, sodium or calcium bromide or iodide salts, and returning said small fraction to said water stream is performed by diverting a small fraction of said water stream therefrom, introducing the diverted small fraction at one end of an elongated container containing said salts, withdrawing said small fraction from the opposite end of said container, and returning said small fraction to said water stream.

12. The process of claim 11, wherein said small fraction of said water stream diverted therefrom is between about 1 and about 10% thereof by volume.

13. A process for disinfecting a water stream, comprising the steps of:
    generating and mixing with said water stream a stream of air including an effective proportion of oxidizing gas atoms and molecules, including one or more of ionized molecular or atomic oxygen, nitrogen, or ozone, and
    generating and mixing with said water stream a stream of metallic ions, including at least two types of ions from the group consisting of copper, silver, and manganese ions.

14. The process of claim 13, wherein said streams of water, air including oxidizing gas atoms and molecules, and metallic ions, are mixed with one another substantially simultaneously under highly turbulent flow conditions.

15. The process of claim 13, wherein said step of generating and mixing with said water stream a stream of metallic ions, including at least two types of ions from the group consisting of copper, silver, and manganese ions, is performed by application of direct current across pairs of electrodes disposed in said water stream, the materials of said electrodes being selected from the group of alloys comprising: between 70–95 weight % copper, up to 1 weight % silica, balance manganese; 80–90 weight % manganese, 1–10 weight % silica, and at least 5–10 weight % silver, or 5–10 weight % copper; and 50–95 weight % copper, up to 1 weight % silica, balance silver.

16. The process of claim 15, wherein direct current of between 6–24 volts and 500–5000 milliamperes is supplied to said electrodes, and the polarity of said direct current is reversed at intervals of between 1 second–5 minutes.

17. A process for disinfecting a water stream, comprising the steps of:

exposing a small fraction of said water stream to one or more salts of the group consisting of silver, sodium, or calcium bromide or iodide salts, and returning said small fraction to said water stream; and generating and mixing with said water stream a stream of air including an effective proportion of oxidizing gas atoms and molecules, including one or more of ionized molecular or atomic oxygen, nitrogen, or ozone.

18. The process of claim 17, wherein said streams of water, including said returned small fraction thereof, and air including oxidizing gas atoms and molecules, are mixed with one another substantially simultaneously under highly turbulent flow conditions.

19. The process of claim 17, wherein said stream of air including an effective proportion of oxidizing gas atoms and molecules is formed by exposing a stream of atmospheric air to ultraviolet radiation provided by one or more ultraviolet lamps driven by high-frequency alternating current supplied to said lamp(s) at between 50–115 volts, 500–1500 milliamperes, and 20,000–50,000 Hz.

20. The process of claim 19, wherein said high-frequency alternating current is furthermore pulsated at a significantly lower frequency between 70% and 100% of its full value.

21. Apparatus for the disinfection of water, comprising:

means for exposing a small fraction of a water stream to one or more salts selected from the group consisting of silver, sodium, or calcium bromide or iodide, and returning said small fraction to said water stream, and means for generating and mixing with said water stream a stream of air including an effective proportion of oxidizing gas atoms and molecules, including one or more of ionized molecular or atomic oxygen, nitrogen, or ozone;

wherein said means for exposing a small fraction of a water stream to said selected salts and for returning said small fraction to said water stream comprises a canister filled with said salts, having a transverse passage extending across its upper end, a first inlet end of said transverse passage being connected to an inlet conduit, a second conduit being connected to said transverse passage and extending downwardly therefrom and terminating in an open end juxtaposed to a lower closed end of said canister, and a metering orifice being formed in a second outlet end of said transverse passage of reduced cross-sectional area, such that when said canister is filled with water from said stream by said second conduit, said small fraction of said water stream is returned thereto through said metering orifice after having been exposed to said salts in said canister for at least a minimum average residence time.

22. The apparatus of claim 21, further comprising means for mixing said streams of water, including said returned small fraction thereof, and air including oxidizing gas atoms and molecules, with one another substantially simultaneously under highly turbulent flow conditions.

23. The apparatus of claim 21, further comprising means for generating and mixing with said water stream a stream of metallic ions, including one or more of copper, manganese, and silver ions.

24. The apparatus of claim 23, wherein said means for generating and mixing with said water stream a stream of metallic ions, including one or more of copper, manganese, and silver ions comprises pairs of electrodes cast of the materials of the ions to be released, disposed in said stream of water, and means for applying DC power at 6–24 V, 500–5000 ma across said pairs of electrodes.

25. A apparatus of claim 21, wherein the cross-sectional area of said second outlet end of said transverse passage is between about 50–90% of the area of said first inlet end of said transverse passage, whereby a suction is created over said downwardly-opening metering orifice therein, drawing said small fraction of said water stream through said canister to be returned to said water stream through said metering orifice.

26. The apparatus of claim 21, wherein the cross-sectional area of said metering orifice is between about 1–20% of the cross-sectional area of said second outlet end of said transverse passage.

27. The apparatus of claim 21, wherein said reduced cross-sectional area of said second outlet end of said transverse passage is formed by inserting a length of tubing into said second end of said transverse passage, and said metering orifice is formed by drilling a hole in said length of tubing prior to insertion and inserting said section of tubing into said outlet end of said transverse passage such that orifice is oriented downwardly, open to the interior of said canister.

28. Apparatus for the disinfection of water, comprising:

means for generating and mixing with said water stream a stream of air including an effective proportion of oxidizing gas atoms and molecules, including one or more of ionized molecular or atomic oxygen, nitrogen, or ozone, means for generating and mixing with said water stream a stream of metallic ions, including manganese and one or more of copper and silver ions; and means for separating and exposing a small fraction of said water stream to one or more of salts selected from the group consisting of silver, sodium, or calcium bromide or iodide, and returning said small fraction to said water stream.

29. The apparatus of claim 28, further comprising means for mixing said streams of water, including said returned small fraction thereof, and air including ionized and oxidizing gas atoms and molecules, with one another substantially simultaneously under highly turbulent flow conditions.

30. The apparatus of claim 28, wherein said means for generating and mixing with said water stream a stream of metallic ions, including one or more of copper, manganese, and silver ions comprises pairs of electrodes cast of the materials of the ions to be released, disposed in said stream of water, and means for applying DC power at 6–24 V, 500–5000 ma across said pairs of electrodes.

31. A process for disinfecting a recirculating stream of water, as encountered in coin-operated laundries, as a heat exchange medium in industrial or air conditioning plants, or in swimming pools, spas, or the like, comprising the steps of:

generating and mixing with said water stream a stream of air including an effective proportion of oxidizing gas atoms and molecules, including one or more of ionized molecular or atomic oxygen, nitrogen, or ozone, and generating and mixing with said water stream a stream of metallic ions, including one or more of copper, manganese, and silver ions.

32. A process for disinfecting a recirculating stream of water, as encountered in hotel, restaurant, hospital, or commercial laundry operations, municipal, industrial, or commercial water supplies, and the like, comprising the steps of:

exposing a small fraction of said water stream to one or more salts selected from the group including silver, sodium, or calcium bromide or iodide, and returning said small fraction to said water stream;

generating and mixing with said water stream a stream of air including an effective proportion of oxidizing gas atoms and molecules, including one or more of ionized molecular or atomic oxygen, or nitrogen, ozone, and generating and mixing with said water stream a stream of metallic ions, including one or more of copper, manganese, and silver ions.

33. A process for disinfecting a recirculating stream of water, as encountered in industrial operations, commercial recycle and water recovery operations, and the like, comprising the steps of:

exposing a small fraction of said water stream to one or more salts from the group including silver, sodium, or calcium bromide or iodide salts, and returning said small fraction to said water stream; and generating and mixing with said water stream a stream of air including an effective proportion of oxidizing gas atoms and molecules, including one or more of ionized molecular or atomic oxygen, nitrogen, or ozone.

34. A method for recycling and disinfecting a limited supply of water used in flushing aircraft toilets and like uses, including the steps of:

providing an initial charge of water in supply and collection tanks;

withdrawing water from said supply tank to flush said toilets;

collecting water having been used to flush toilets in said collection tank;

providing a filtration compartment within the collection tank, for containing a filter for filtering solids from water in said collection tank; and disinfecting the filtered water by:

mixing with said filtered water streams of one or more of ionized gas plasma, ions released from metallic electrodes, or water having been exposed to salts of one or more of silver, calcium and sodium bromide and iodide mixtures; and returning said disinfected stream to said supply tank.

* * * * *